United States Patent
Sidorovich Paradiso

(10) Patent No.: US 11,560,844 B2
(45) Date of Patent: Jan. 24, 2023

(54) INERTIAL PARTICLE SEPARATOR FOR A TURBINE SECTION OF A GAS TURBINE ENGINE

(71) Applicant: PRATT & WHITNEY CANADA CORP., Longueuil (CA)

(72) Inventor: Ivan Sidorovich Paradiso, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/178,932

(22) Filed: Feb. 18, 2021

(65) Prior Publication Data

US 2022/0260014 A1    Aug. 18, 2022

(51) Int. Cl.
  *F02C 7/052* (2006.01)
  *F01D 5/08* (2006.01)

(52) U.S. Cl.
  CPC .............. *F02C 7/052* (2013.01); *F01D 5/082* (2013.01); *F01D 5/081* (2013.01); *F01D 5/085* (2013.01); *F01D 5/087* (2013.01); *F05D 2240/126* (2013.01); *F05D 2260/607* (2013.01)

(58) Field of Classification Search
  CPC .... F01D 5/082; F02C 7/052; F05D 2260/607; F05D 2240/126
  See application file for complete search history.

(56) References Cited

U.S. PATENT DOCUMENTS

| | | | |
|---|---|---|---|
| 2004/0115054 A1* | 6/2004 | Balland | F01D 5/18 416/97 R |
| 2017/0082027 A1* | 3/2017 | Zelesky | F01D 5/081 |
| 2017/0122202 A1* | 5/2017 | Rahaim | F02C 7/18 |
| 2018/0298774 A1* | 10/2018 | Carlson | F01D 11/04 |
| 2021/0025595 A1* | 1/2021 | Prenter | F23R 3/002 |

* cited by examiner

*Primary Examiner* — Katheryn A Malatek
*Assistant Examiner* — Alyson Joan Harrington
(74) *Attorney, Agent, or Firm* — Norton Rose Fulbright Canada LLP

(57) ABSTRACT

A gas turbine engine, has: a compressor; a turbine having a rotor; and an inertial particle separator located upstream of the turbine downstream of the compressor, the inertial particle separator having: an intake conduit in fluid flow communication with the compressor and defining an elbow, a splitter, a leading edge of the splitter located downstream of the elbow, the splitter located to divide a flow into a particle flow and an air flow, and an inlet conduit and a bypass conduit located on respective opposite sides of the splitter, the inlet conduit receiving the air flow, the inlet conduit in fluid flow communication with a cavity containing the rotor for cooling the rotor of the turbine section, the bypass conduit receiving the particle flow, the bypass conduit in fluid flow communication with an environment outside the gas turbine engine while bypassing the cavity containing the rotor.

20 Claims, 6 Drawing Sheets

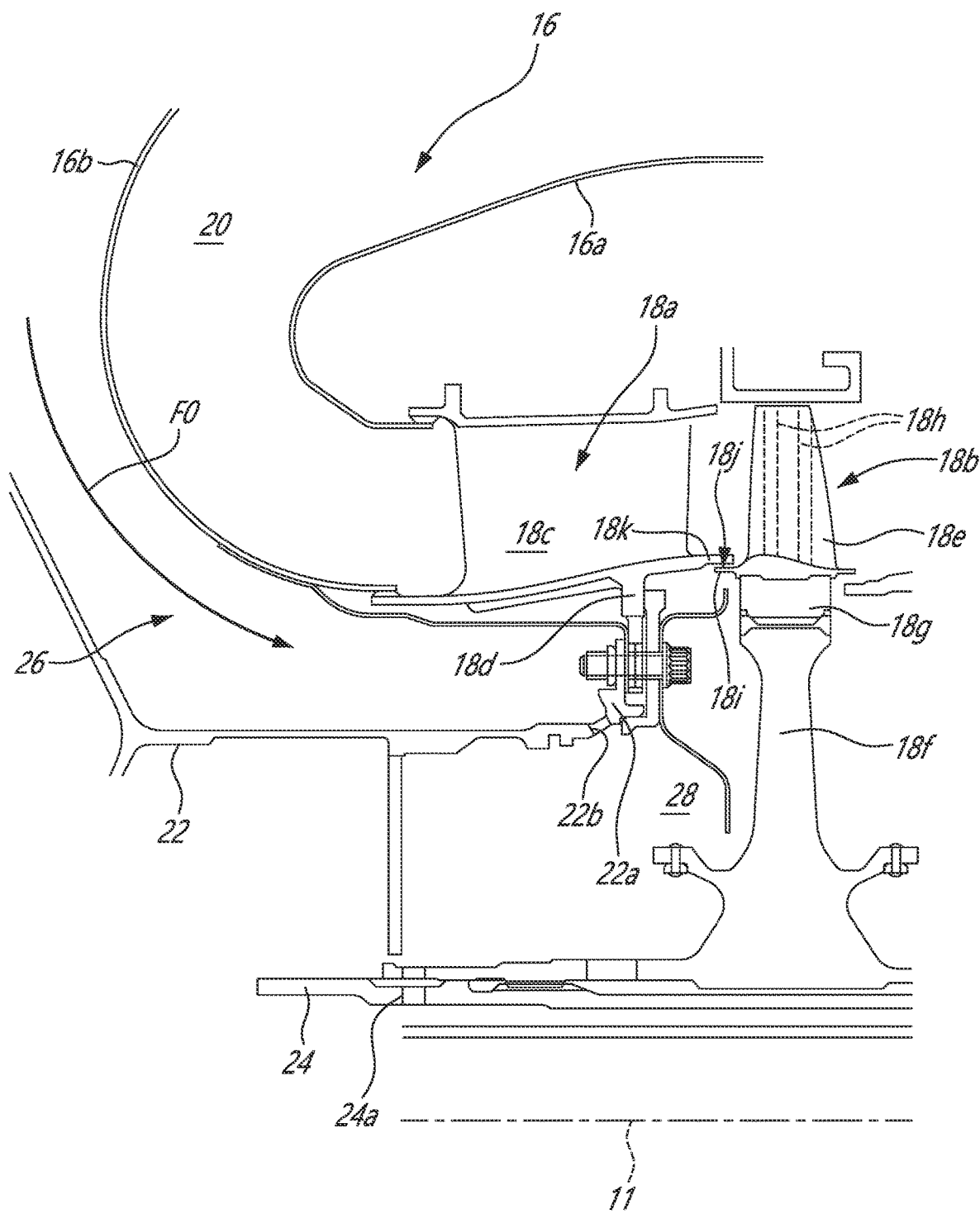

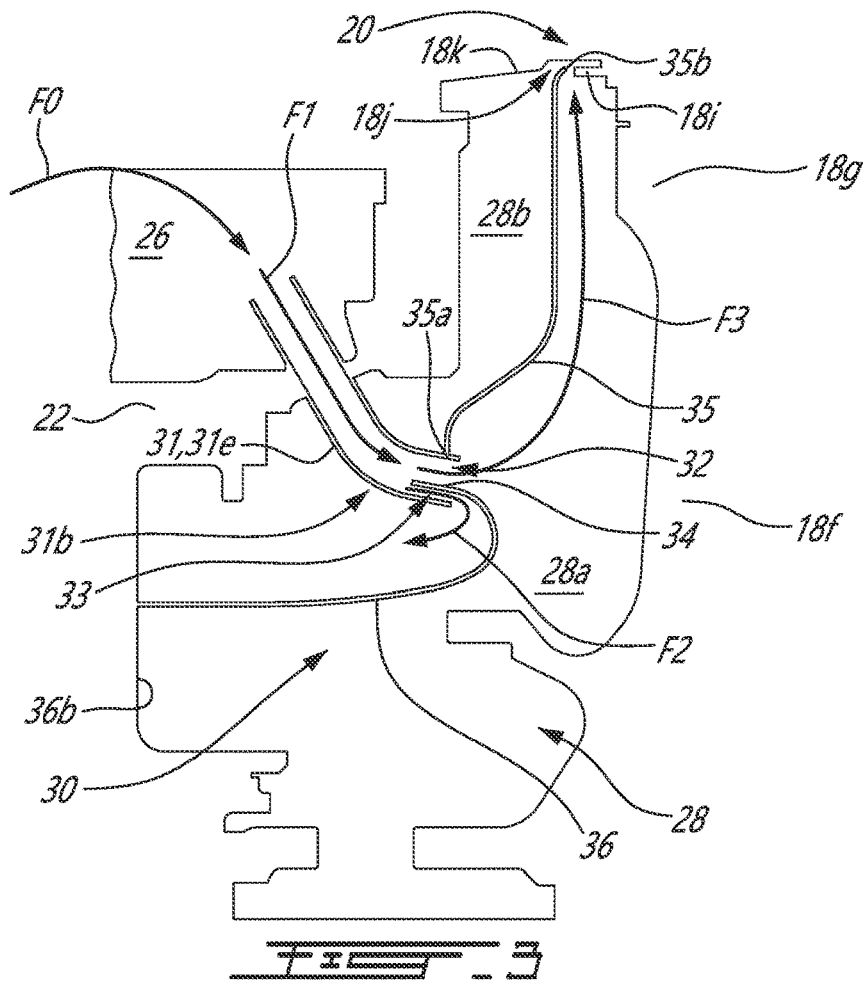
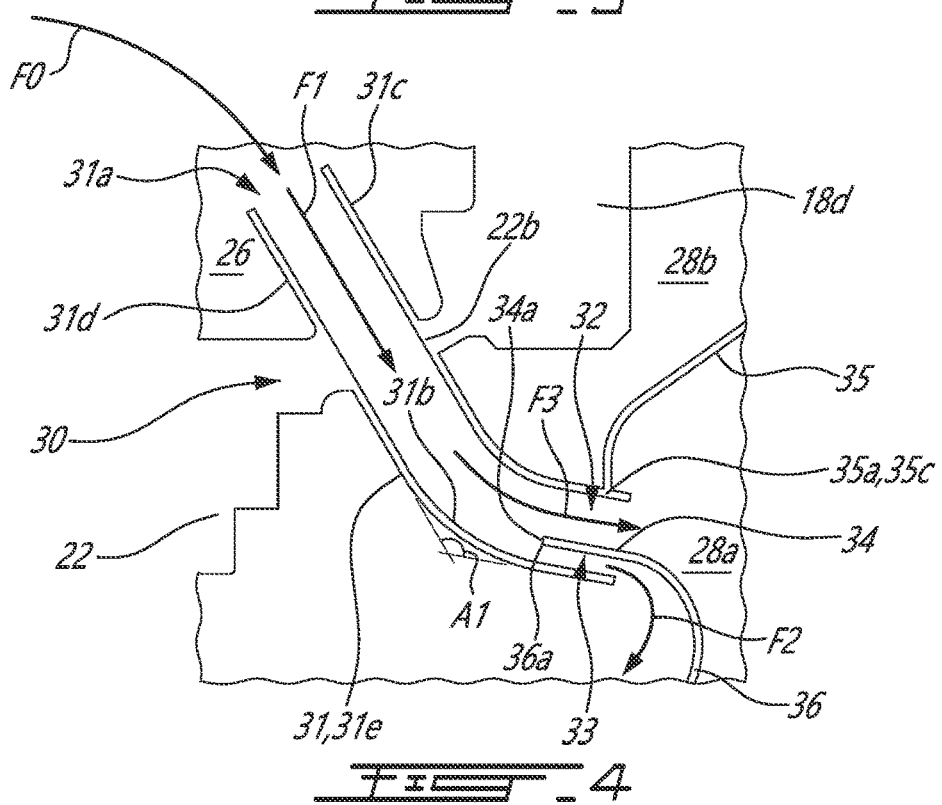

INERTIAL PARTICLE SEPARATOR FOR A TURBINE SECTION OF A GAS TURBINE ENGINE

TECHNICAL FIELD

The application relates generally to gas turbine engines and, more particularly, to turbine sections used in such engines and to cooling systems therefore.

BACKGROUND OF THE ART

Gas turbine engines operate at temperatures above which many materials are unable to withstand. A solution used in the aerospace industry to overcome the material heat limitation is the use of pressurized cooling air generated by the compressor section of the engine. The cooling air passes around and through hotter components removing heat from them and allowing continued reliable operation using materials and metal alloys in demanding high temperature exposure conditions. The generation of compressed air and conveying the cooling air consumes energy. To reduce the effect of cooling air consumption on overall engine performance and fuel efficiency, the quantity of cooling air is generally kept to the minimum possible using small orifices and narrow cooling passages.

During standard operation, the cooling passages are typically sufficient for the purposes required. However, during operation in high contamination environments where large quantities of fine particulate matter, such as sand, is suspended in the surrounding air, proper flow may be impeded in these narrow passages by these contaminants. While larger particles can be separated by centrifugal force in the air inlet duct, engaging the inlet fan and exhausted through a bypass duct, smaller suspended particles and chemical contaminants may continue to be carried into the engine core with the air flow into the compressor, combustor and turbine sections. The result of air passages blocked by accumulation of small suspended particles and chemical contaminants can include overheating of cooled components which may have detrimental effects such as lead to engine removal or early overhaul, seal replacement, and spare part consumption. Improvements are therefore sought.

SUMMARY

In one aspect, there is provided a gas turbine engine, comprising: a compressor section; a turbine section downstream of the compressor section, the turbine section having a rotor rotatable about a central axis; and an inertial particle separator located upstream of the turbine section and downstream of the compressor section relative to a cooling air flow from the compressor section, the inertial particle separator having: an intake conduit in fluid flow communication with the compressor section, the intake conduit defining an elbow, a splitter, a leading edge of the splitter located downstream of the elbow, the splitter located to divide a flow received in the intake conduit into a particle flow and an air flow, and an inlet conduit and a bypass conduit located on respective opposite sides of the splitter, the inlet conduit receiving the air flow, the inlet conduit in fluid flow communication with a cavity containing the rotor for cooling the rotor of the turbine section, the bypass conduit receiving the particle flow, the bypass conduit in fluid flow communication with an environment outside the gas turbine engine while bypassing the cavity containing the rotor.

In some embodiments, the turbine section includes stator vanes located upstream of the rotor, the stator vanes secured to a structural member, the intake conduit extending in an aperture defined through the structural member.

In some embodiments, the aperture includes a plurality of apertures circumferentially distributed about the central axis and wherein the intake conduit includes a plurality of intake conduits each extending in a respective one of the plurality of apertures.

In some embodiments, the plurality of intake conduits are tubes, each of the tubes received within a respective one of the plurality of apertures.

In some embodiments, the tubes have circular cross-sections.

In some embodiments, the intake conduit is defined by a tube extending through the aperture, a portion of the tube extending away from the structural member and away from the rotor into an annular plenum circumferentially extending around the central axis, the annular plenum defined radially between the structural member and an outer liner of a combustor of the gas turbine engine, the combustor located downstream of the compressor section and upstream of the turbine section.

In some embodiments, the inertial particle separator includes a first baffle, the intake conduit extending through the first baffle, a second baffle secured to the first baffle, a portion of the second baffle extending into the intake conduit to define the splitter.

In some embodiments, the first baffle has a first edge secured to the second baffle and a second edge opposed to the first edge, the second edge extending radially outwardly relative to the central axis and radially overlapping slots of a disk of the rotor, the slots receiving roots of blades of the rotor.

In some embodiments, the first baffle has a first edge secured to the second baffle and a second edge opposed to the first edge, the second edge secured to a structural member of the gas turbine engine.

In some embodiments, the cavity is a first cavity located between the first baffle and the second baffle and the rotor, a second cavity located between the first baffle and the second baffle and a bearing housing of the gas turbine engine, the first cavity communicating with the inlet conduit, the second cavity communicating with the bypass conduit.

In some embodiments, an outlet of the second cavity is defined by an annular gap between a radially outer edge of the first baffle and shrouds of vanes of a turbine stator located upstream of the rotor, or wherein the outlet is defined by an aperture through a shaft of the gas turbine engine, the aperture communicating with an internal passage of the shaft.

In another aspect, there is provided an inertial particle separator (IPS) for a turbine section of a gas turbine engine, comprising: a first baffle; a tube secured to the first baffle and extending in an aperture defined through first baffle, the tube sized to extend in an aperture defined by a structural member of the gas turbine engine, the tube defining an elbow; and a second baffle secured to the first baffle, an edge of the second baffle extending into the tube and dividing the tube into an inlet conduit and a bypass conduit on opposite sides of the second baffle, the edge of the second baffle located downstream of the elbow relative to a direction of a cooling air flow into the tube.

In some embodiments, the first baffle and the second baffle are annular and extend around a central axis of the gas turbine engine.

In some embodiments, the tube includes a plurality of tubes distributed around the central axis, each of the plurality of tubes extending through a respective one of a plurality of apertures of the aperture defined through the first baffle.

In some embodiments, the tube has a length selected such that an inlet of the tube is offset from the aperture defined by the structural member.

In some embodiments, the first baffle is sized such that a radially outer edge of the first baffle is located proximate platforms of blades of a rotor of the turbine section.

In yet another aspect, there is provided a method of supplying cooling air to a rotor of a turbine section of a gas turbine engine, the method comprising: receiving a cooling air flow from a compressor section of the gas turbine engine into an intake conduit, the cooling air flow containing air and particles; inducing separation of the particles from the air by changing a direction of the received cooling air flow into the intake conduit; separating the received cooling air flow into a particle flow and an air flow, flowing the particle flow toward an environment outside the gas turbine engine via a bypass conduit while bypassing a cavity containing the rotor, and flowing the air flow in the cavity to cool the rotor via an inlet conduit.

In some embodiments, the receiving of the cooling air flow includes receiving the cooling air flow in a plenum upstream of the intake conduit, the intake conduit extending into the plenum.

In some embodiments, the inducing of the separation includes separating the received cooling air flow with a splitter extending into the intake conduit, the splitter separating the intake conduit into the bypass conduit and the inlet conduit.

In some embodiments, the flowing of the particle flow toward the environment and the flowing of the air flow in the cavity includes: receiving the particle flow into a second cavity separated from the cavity via a baffle and flowing the received particle flow from the second cavity toward the environment, and receiving the air flow into the cavity containing the rotor for cooling the rotor.

DESCRIPTION OF THE DRAWINGS

Reference is now made to the accompanying figures in which:

FIG. 2 is a cross-sectional view showing portion of a combustor and of a turbine section of the gas turbine engine of FIG. 1;

FIG. 3 is an enlarged view of a portion of FIG. 2 showing an exemplary implementation of an inertial particle separator in accordance with one embodiment between the combustor and the turbine section;

FIG. 4 is an enlarged view of a portion of FIG. 3;

DETAILED DESCRIPTION

Figure 1:
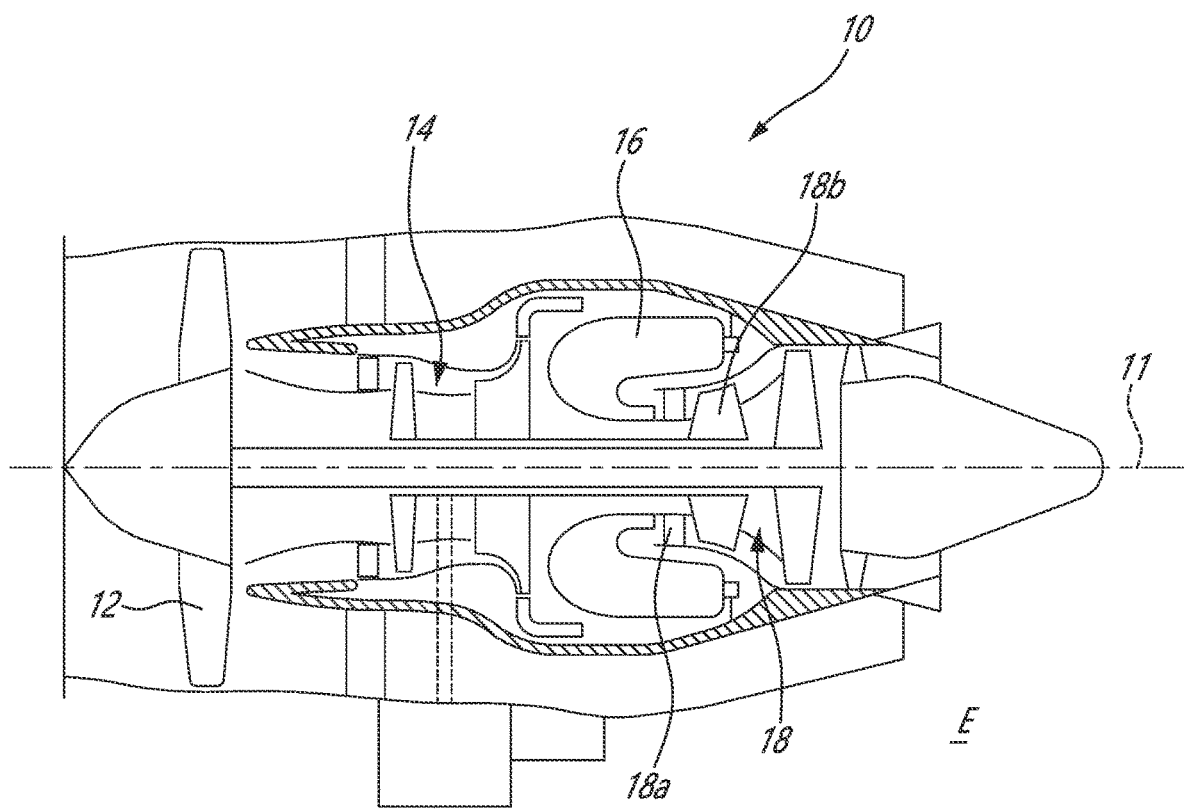
FIG. 1 is a schematic cross sectional view of a gas turbine engine.
Figure 5:
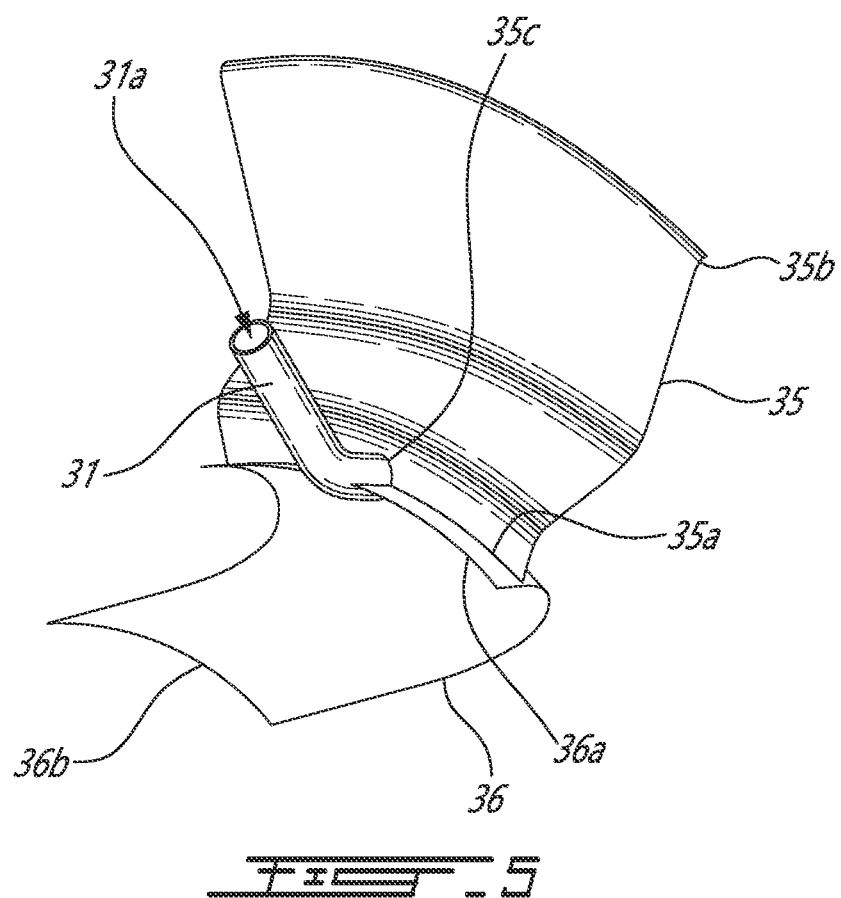
FIG. 5 is a partially transparent three dimensional view showing a circumferential section of the inertial particle separator of FIG. 3.
Figure 6:
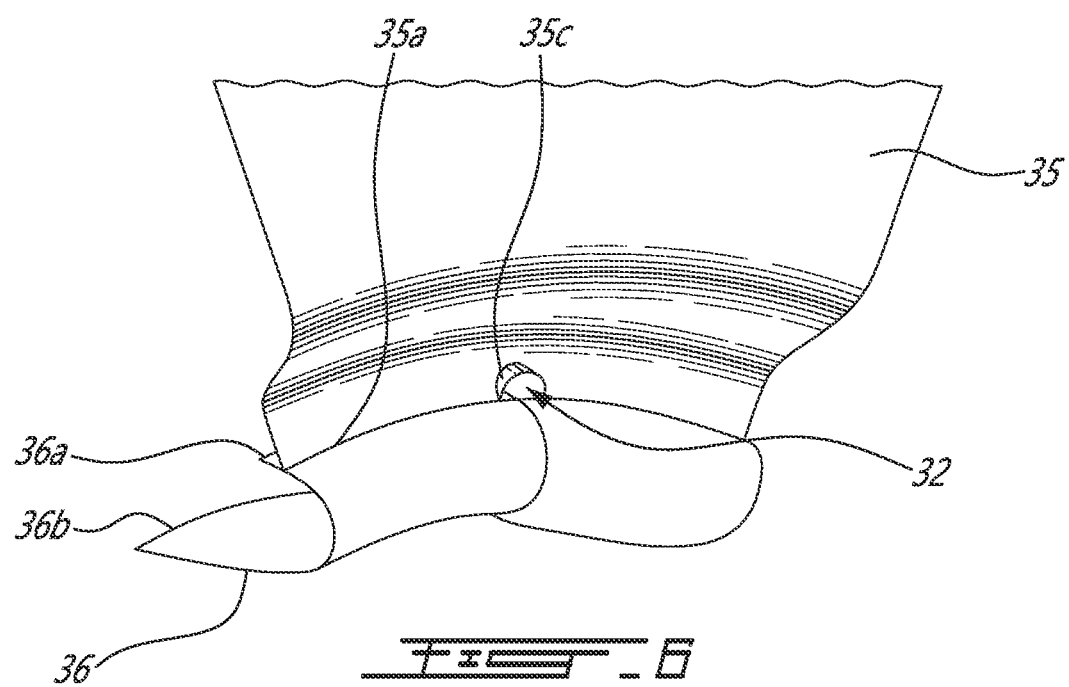
FIG. 6 is another partially transparent three dimensional view showing the circumferential section of the inertial particle separator of FIG. 3 at a different angle.

FIG. 1 illustrates a gas turbine engine 10 of a type preferably provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the engine 10. The engine 10 is depicted here as a turbofan engine, but the present disclosure may apply to any gas turbine engine, such as, an Auxiliary Power Unit (APU), a turboprop, and a turboshaft.

Referring to FIGS. 1-2, the turbine section 18 may include a plurality of stages serially fluidly connected to one another. A first one of these stages is located immediately downstream of the combustor 16 and includes a stator 18a and a rotor 18b downstream of the stator 18a. In the embodiment shown, the stator 18a includes a plurality of stator vanes 18c that are circumferentially distributed around the central axis 11. The stator vanes 18c are non-rotatable relative to the combustor 16 and are used to orient a flow of combustion gases of an annular gaspath 20 of the engine 10 toward the rotor 18b. The annular gaspath 20 is contained between inner and outer casing of the engine and, in the combustor 16, the annular gaspath 20 is defined between an inner liner 16a and an outer liner 16b.

As shown in FIG. 2, the stator vanes 18c are secured to a casing of the engine 10 via a structural member 22 of the engine 10. The stator vanes 18c have flanges 18d that are bolted to a flange 22a of the structural member 22. In the embodiment shown, the structural member 22 is a bearing housing sized to contain a bearing and to define a bearing cavity receiving oil for proper lubrication of the bearing.

The rotor 18b includes blades 18e that are circumferentially distributed around the central axis 11 and that are secured to a periphery of a disk 18f. In the depicted embodiment, the blades 18e have blade roots that are received into correspondingly shaped slots 18g defined by the disk 18f. Alternatively, the blades 18e and the disk 18f may be portions of a monolithic part referred as an integrally bladed rotor, or "blisk". The rotor 18b is engaged to a shaft 24 of the engine 10. The shaft 24 may be a high-pressure shaft. The engine 10 may further includes a low-pressure shaft that may be concentric with the high-pressure shaft 24. In use, combustion gases exiting the combustor 16 flows past the stator vanes 18c and induce rotation of the rotor 18b thereby rotating the shaft 24, which is drivingly engaged to one or more stages of the compressor section 14 of the engine 10.

In use, the combustion gases are at high temperatures. To cool down the rotor 18b, cooling air may be injected into a cavity containing the disk 18f of the rotor 18b and, in some embodiments, into internal cooling flow passages 18h defined by the blades 18e. The internal cooling flow passages 18h are shown schematically with dashed lines in FIG. 2. The cooling air typically comes from the compressor section 14. This air flows along a cooling air flow F0 within a plenum 26, which may be annularly extending around the central axis 11 and defined radially between the structural member 22 and the outer liner 16b of the combustor 16. This plenum 26 is in fluid flow communication with the cavity and may be in fluid flow communication with the internal cooling flow passages 18h of the blades 18e, if the internal cooling flow passages 18h are present, such that heat imparted to the rotor 18b by the combustion gases may be picked up by the air flowing into the cavity containing the rotor 18b and expelled into the annular gaspath 20.

Still referring to FIG. 2, the structural member 22 defines an aperture 22b, a plurality of apertures 22b circumferentially distributed around the central axis 11 in the present embodiment, that extends therethrough. The apertures 22b may extend through the flange 22a that is bolted to the flanges 18d of the stator vanes 18c. The air of the cooling air flow F0 therefore reaches a cavity 28 that contains the disk 18f of the rotor 18b via the apertures 22b. This air is therefore able to reach the cavity 28 containing the disk 18f and, in some cases, reaches inlets of the internal cooling flow passages 18h, if such passages are present. The inlets of the internal cooling flow passages 18h may be located proximate the slots 18g where the blades 18e are engaged to the disk 18f.

However, when the engine 10 is operated in some regions of the world where a concentration of particles, such as dust and sand, is above a given threshold, these particles may reach the plenum 26 and the cavity 28 and may flow into the internal cooling flow passages 18h of the blades 18e and/or may flow into gaps defined at the slots 18g between the blades 18e and the disk 18f. Accumulation of particles in these gaps may have detrimental effects on the blades 18e as a result of thermal stress. With time, these particles may affect a flow of cooling air into the internal cooling flow passages 18h. Gas turbine engines, such as turboprop and turbofan, may be equipped with separators at their inlets. However, in some applications, for instance, for APU, it might be difficult to add such a separator. Moreover, some finer particles may still find their way into the annular gaspath 20 regardless of whether or not an inlet separator is used. To at least partially alleviate this drawback, the engine 10 is equipped with an inertial particle separator to remove at least a portion of the particles (e.g., sand) before said air flows into the internal cooling flow passages 18h. Moreover, the disclosed inertial particle separators may be retrofitted to existing gas turbine engines, such as existing APUs.

Referring now to FIGS. 3-6, an inertial particle separator (IPS) in accordance with one embodiment is shown at 30. The IPS 30 includes an intake conduit 31, an inlet conduit 32, and a bypass conduit 33. In the present embodiment, the intake conduit 31, the inlet conduit 32, and the bypass conduit 33 include a plurality of intake, inlet, and bypass conduits 31, 32, 33 circumferentially distributed around the central axis 11. The cross-section shown in FIGS. 3-4 may therefore be repeated at a plurality of circumferential positions around the central axis 11.

Each of the intake conduits 31 has an inlet 31a that is in fluid flow communication with the plenum 26 between the structural member 22 and the outer liner 16b of the combustor 16. Each of the intake conduits 31 defines an elbow 31b to impart a change of direction to an air and particle flow F1 received into the intake conduit 31 via the inlet 31a. The IPS 30 includes a splitter, a plurality of splitters 34 in the present embodiment, that extend into the intake conduits 31. The splitters 34 have leading edges 34a that are received into the intake conduits 31 and located downstream of the elbows 31b relative to a direction of the air and particle flow F1.

Each of the intake conduits 31 has a radially-outer wall 31c and an opposed radially-inner wall 31d. The splitters 34 are located between the radially-outer wall 31c and the radially-inner wall 31d and divides the intake conduits 31 into the inlet conduits 32 and the bypass conduits 33. Each of the inlet conduits 32 has an inlet between the radially-outer wall 31c and the splitter 34 and an outlet between the radially-outer wall 31c and the splitter 34. Each of the bypass conduits 33 has an inlet between the radially-inner wall 31d and the splitter 34 and an outlet between the radially-inner wall 31d and the splitter 34.

The elbows 31b impart a change of direction in the intake conduits 31 to decrease a component in a radial direction relative to the central axis 11. That is, the intake conduits 31 curve at the elbows 31b to increase an axial component of a direction of the flow F1 flowing therein. This change of direction, from being, in one embodiment, mainly radial to being mainly axial, causes the air to follow this change of direction, but because the particles (e.g., dust, sand) are heavier, they miss this change of direction and tend to remain proximate to the radially-inner walls 31d of the intake conduits 31. Hence, the air and particle flow F1 that flows into the intake conduits 31 becomes stratified in two layers: an inner layer and an outer layer. A concentration of the particles is greater in the outer layer adjacent the radially-inner walls 31d than in the inner layer adjacent the radially-outer walls 31c whereas the particle concentration might have been substantially uniform in the intake conduits 31 upstream of the elbows 31b. The splitters 34 are located such that the leading edges 34a are positioned to separate the inner layers from the outer layers. At which point, the inner layers flow into the inlet conduits 32 toward the internal cooling flow passages 18h and the outer layers flow into the bypass conduits 33 toward an environment E outside the gas turbine engine 10 while bypassing the internal cooling flow passages 18h. As discussed below, the bypass conduits 33 are fluidly connected to the environment E via the annular gaspath 20 or via a passage defined by a shaft 24 of the engine 10.

It will be appreciated that other configurations of the intake conduits 31 are contemplated depending of where it will be installed in the engine 10 between the combustor 16 and turbine section 18. For instance, the elbows 31b may change a direction of the flow F1 from being mainly axial to being mainly radial. In some cases, this change of direction may impart a circumferential component to the flow. Therefore, any suitable configuration able to impart a change of direction of the flow resulting in a separation of the particles from the air is contemplated without departing from the scope of the present disclosure.

In the embodiment shown, the intake conduits 31 are tubes 31e that are received within the apertures 22b defined through the flange 22a of the structural member 22. The apertures receiving the tubes 31e may be defined through any suitable component, for instance, through the flange of the stator 18a of the turbine section 18. The tubes 31e are circumferentially distributed about the central axis 11. Each of the tubes 31e is inserted into a respective one of the apertures 22b. The tubes 31e of the present embodiment have a circular cross-section. However, any other suitable shape is contemplated. For instance, the tubes 31e may be square, oval, elliptical, and so on. In one embodiment, the inlet conduit 32 may be annularly extending around the central axis 11. That is, the radially-outer wall 31c and the radially-inner wall 31d may be annularly extending around the central axis 11. In one embodiment, they may extend fully around the central axis 11. In another embodiment, they may extend around a portion of a circumference around the central axis 11. It is further contemplated that the splitters 34 are located downstream of outlets of the tubes 31e as long as they are adequately positioned to efficiently separate the two layers described above.

As shown in FIG. 3, a portion of the tubes 31e extend into the plenum 26 past the apertures 22b in an upstream direction relative to the cooling air flow F0. In other words, the inlets 31a of the intake conduits 31 are offset from the apertures 22b. In use, particles may accumulate in the plenum 26 against the structural member 22. Having the tubes 31e protruding into the plenum 26 may avoid these accumulated particles from flowing into the tubes 31e.

Referring to FIGS. 3-6, the IPS 30 includes a first baffle 35 and a second baffle 36. The splitters 34 are defined by the second baffle 36. The first and second baffles 35, 36 may be annular plates extending circumferentially all around the central axis 11. The first and second baffles 35, 36 may include a plurality of plates secured to one another to extend annularly all around the central axis 11. Although not shown, the first baffle 35 may be secured to the flange 22a of the structural member 22 and/or to the flanges 18d of the stator 18a. The first baffle 35 has a radially-inner edge 35a and a radially-outer edge 35b. The radially-inner edge 35a of the first baffle 35 defines apertures 35c through which the tubes 31e extend. The tubes 31e protrude radially-inwardly toward the central axis 11 beyond the radially-inner edge 35a of the first baffle 35. The tubes 31e may be secured to the first baffle 35.

The second baffle 36 has a first edge 36a, which defines the leading edges 34a of the splitters 34. The second baffle 36 has a second edge 36b that is located axially offset and radially inward of the first edge 36a relative to the central axis 11. The second baffle 36 defines a curve, or a C-shape. In other words, the second baffle 36 curves in a radially-inward direction relative to the central axis 11 downstream of tubes 31e to guide the particles away from the rotor 18b. The second baffle 36 is secured to the radially-inner edge 35a of the first baffle 35 between the first and second edges 36a, 36b of the second baffle 36 and may be secured to the tubes 31e. A portion of the second baffle 36 is therefore transverse to the first baffle 35. The second baffle 36 is therefore received into the tubes 31e. Downstream of the elbows 31b, the tubes 31e are therefore divided into the inlet conduits 32, which includes spaces between the second baffle 36 and the radially-outer walls 31c of the tubes 31e, and into the bypass conduit 33, which includes spaces between the second baffle 36 and the radially-inner walls 31d. The inlet conduits 32 are herein located radially-outwardly of the bypass conduits 33 relative to the central axis 11. However, other configurations are contemplated depending of the direction change imparted to the tubes 31e at the elbows 31b.

Referring more particularly to FIGS. 3-4, the first and second baffles 35, 36 separates the cavity 28 that receives the cooling air flow F0 into a first cavity, or first plenum or zone, 28a and into a second cavity, or second plenum or zone, 28b. The first cavity 28a and the second cavity 28b may be annular and may extend circumferentially all around the central axis 11. The first cavity 28a is in fluid flow communication with the inlet conduits 32 and leads to the internal cooling flow passages 18h (FIG. 2) of the rotor 18b. The second cavity 28b is in fluid flow communication with the bypass conduits 33 and leads to the environment E outside the gas turbine engine 10 while bypassing the internal cooling flow passages 18h.

As shown in FIG. 3, the radially-outer edge 35b of the first baffle 35 extends radially outwardly beyond a platform 18i of the blades 18e of the rotor 18b such that the particles that have been separated and flown into the second cavity 28b via the bypass conduits 33 are directed into the annular gaspath 20 along side the first baffle 35. The first baffle 35, by so extending radially beyond the platform 18i of the blades 18e of the rotor 18b, may prevent the particles from reaching the inlets of the internal cooling flow passages 18h that may be located proximate the slots 18g that receive the blades 18e of the rotor 18b. In other words, the first baffle 35 may radially overlap inlets of the internal cooling flow passages 18h to shield said inlets from the particles flowing out of the bypass conduits 33 into the second cavity 28b. The second edge 36b of the second baffle 36 may be secured to the structural member 22 (e.g., bearing housing) along an annular joint such that the only outlet of the second cavity 28b may be at the radially-outer edge 35b of the first baffle 35 to discharge the separated particles into the annular gaspath 20 from where they will be expelled with the combustion gases outside the engine 10 in the environment E. This annular joint between the structural member 22 and the second edge 36b of the second baffle 36 may fluidly separate the first cavity 28a from the second cavity 28b to prevent particle migration from one cavity to the other. In the embodiment shown, the outlet of the second cavity 28b is defined by an annular gap 18j between shrouds 18k of the stator vanes 18c and the radially-outer edge 35b of the first baffle 35. An outlet of the first cavity 28a may be defined by an annular gap between the radially-outer edge 35b of the first baffle 35 and the platforms 18i of the blades 18e of the rotor 18b.

In use, the air and particle flow F1 is received into the tubes 31e. As this flow F1 changes direction because of the elbow 31b, the particles migrate toward the radially-inner wall 31d. The splitter 34 then divides the flow into a particle flow F2 and an air flow F3. The particle flow F2 flows into the second cavity 28b via the bypass conduit 33 and is directed toward the annular gaspath 20 by the two baffles 35, 36. The air flow F3 is received into the first cavity 28a via the inlet conduit 32 and is directed toward the inlet of the internal cooling flow passages 18h of the rotor 18b of the turbine section 18 by the first baffle 35. Air substantially cleaned from the particles it contained may therefore flow into the internal cooling flow passages 18h. The IPS 30 may therefore reduce risks of impeding the flow into these internal cooling flow passages 18h.

Figure 7:
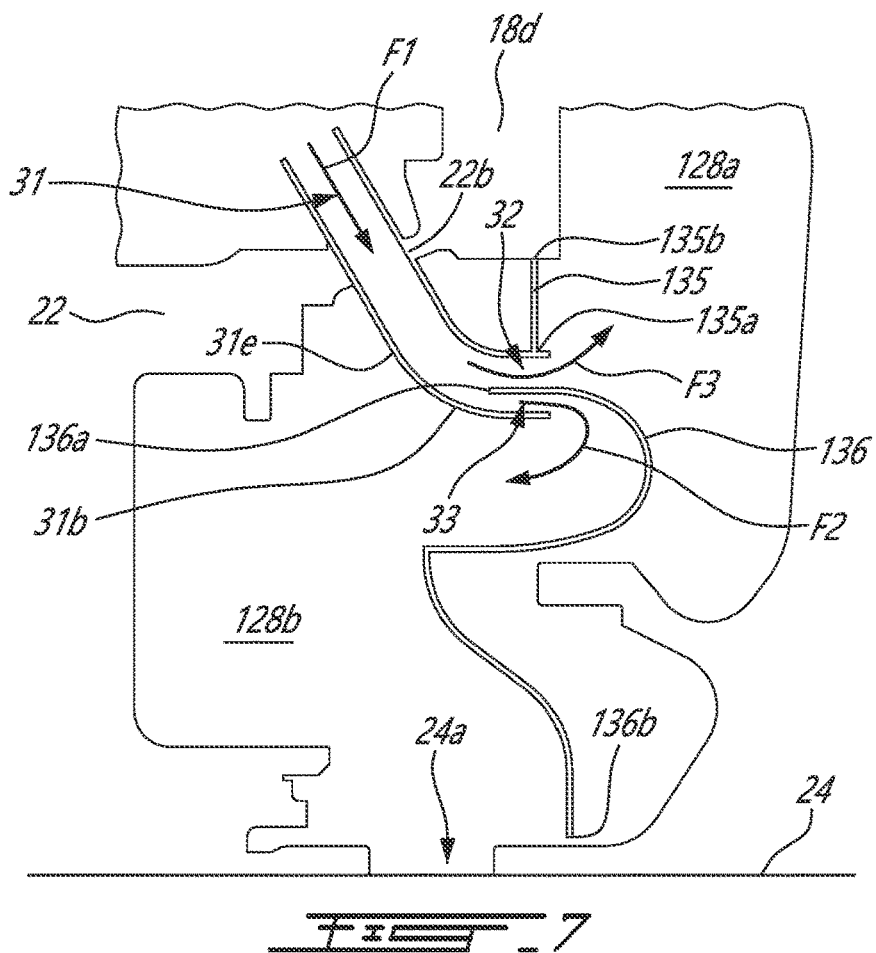
FIG. 7 is an enlarged view of a portion of FIG. 2 showing another exemplary implementation of an inertial particle separator in accordance with another embodiment between the combustor and the turbine section.
Figure 8:
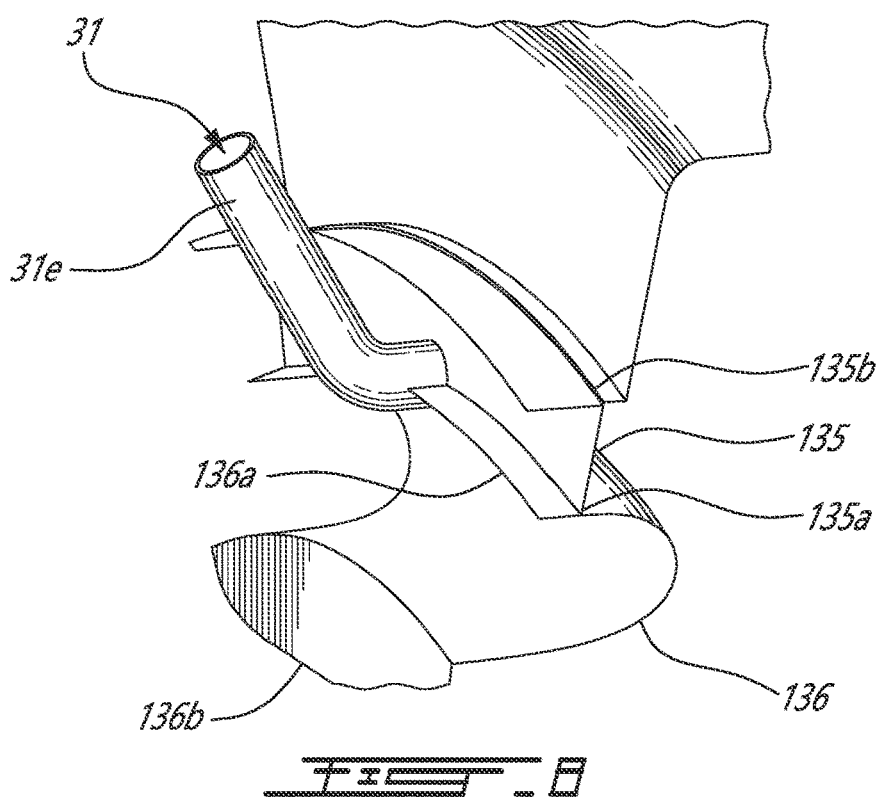
FIG. 8 is a partially transparent three dimensional view showing a circumferential section of the inertial particle separator of FIG. 7.

Referring now to FIGS. 7-8, another embodiment of an IPS is shown at 130. For the sake of conciseness, only elements that differ form the IPS 30 described above with reference to FIGS. 3-6 are described below.

The IPS 130 includes a first baffle 135 that has a radially-inner edge 135a secured to the second baffle 136 and to the tubes 31e. A radially-outer edge 135b of the first baffle 135 is secured to the structural member 22 or to the flange 18d of the stator 18a of the turbine section 18. The second baffle 136 has a portion defining a C-shape such that a first edge 136a of the second baffle 136 extends into the tubes 31e to define the splitter for separating the air and particle flow F1 into the particle flow F2 and the air flow F3.

The first and second baffles 135, 136 divides the cavity 28 into a first cavity 128a and a second cavity 128b. The first cavity 128a fluidly communicates with the internal cooling flow passages 18h of the rotor 18b of the turbine section 18. The second cavity 128b has an outlet corresponding to an aperture 24a defined through the shaft 24 of the engine 10. The shaft 24 is therefore hollow and may define an outlet in communication with the environment E outside the engine 10. Hence, the particles that flows into the bypass conduit 33 end up in the second cavity 128b from where they flow in an internal passage of the shaft 24 to exit the engine 10 and are expelled into the environment E outside the engine 10. In the embodiment shown, the second baffle 136 has a portion that extends radially-inwardly from the C-shape portion and guides the particles toward the apertures 24a defined through the shaft 24. The portion of the second baffle 136 that extends radially-inwardly from the C-shape portion may have an edge 136b located proximate the shaft 24 or to the disk 18f of the rotor 18b to limit the particles from flowing from the second cavity 128b toward the first cavity 128a. A seal, such as a brush seal or a labyrinth seal may be disposed between the second baffle 136 and the shaft 24 or the disk 18f to limit particle migration from one cavity to the other.

In some cases, the particles that are removed may be stored in a dedicated container that is periodically emptied. In the present embodiment, the second cavity 128b is disconnected from the annular gaspath 20.

The number of inlet conduits 32 and tubes 31e to be distributed around the central axis 11 may be based on engine requirements. A diameter of the tubes 31e may be tuned as a function of boundary conditions to be able to provide required cooling flow. A length of the tube 31e that protrudes into the plenum 26 between the bearing housing 22 and the outer liner 16b of the combustor 16 may be at least one diameter of the tube 31e away from the aperture 22b defined through the flange 22a. The lengths of the tube 31e from the apertures 22b to the elbow 31b and from the elbow 31b to the outlets of the tube 31e that correspond to the outlets of the inlet and bypass conduits 32, 33 may be each at least one diameter of the tube 31e. A position of the leading edge 34a of the splitter 34 used to separate the particles and air flows F2, F3 may be selected as a function of boundary conditions to provide required cooling flow. The angle A1 between the portion of the tube 31e upstream of the elbow 31b and the portion of the tube 31e downstream of the elbow 31b is less than 180 degrees and more than 90 degrees in such a way as to capture most of the bouncing particles under the splitter 34. The design parameters of the IPS 30, 130 should be such that a majority (e.g., more than 50%) of the particles are captured into the bypass conduit 33 while respecting the necessary cooling flow at all locations.

For retrofitting an existing gas turbine engine with the disclosed IPS 30, 130, the tubes 31e may be inserted into already existing apertures 22b defined through the flange 22a of the bearing housing 22. The two baffles 35, 36, 135, 136 may be disposed in the cavity 28 between the bearing housing 22 and the rotor 18b of the turbine section 18. The tubes 31e may be disposed such as to extend beyond the apertures 22b into the plenum 26 between the bearing housing 22 and the outer liner 16b of the combustor 16. The second baffle 36 may be secured to the bearing housing 22. Or, alternatively, the second baffle 136 may be brought in close proximity to the shaft 24 or disk 18f of the rotor 18b. In some cases, the IPS includes plurality of sections, each including one or more tubes 31e. The plurality of sections may be installed in position in the engine 10 before being secured to one another. In some cases, the first baffle 35, 135 is secured to the tubes 31e and/or to the second baffle 36, 136 while the baffles are in position in the engine 10 depending of space allowable for installation. Some components may need to be removed prior to installing the IPS 30, 130. The radially-outer edge 35b, 135b of the first baffle 35, 135 may be disposed radially outwardly of the inlets of the internal cooling flow passages 18h to guide particles into the annular gaspath 20 or be secured to the bearing housing 22 or other components to prevent particles from being ingested into the internal cooling flow passages 18h.

Figure 9:
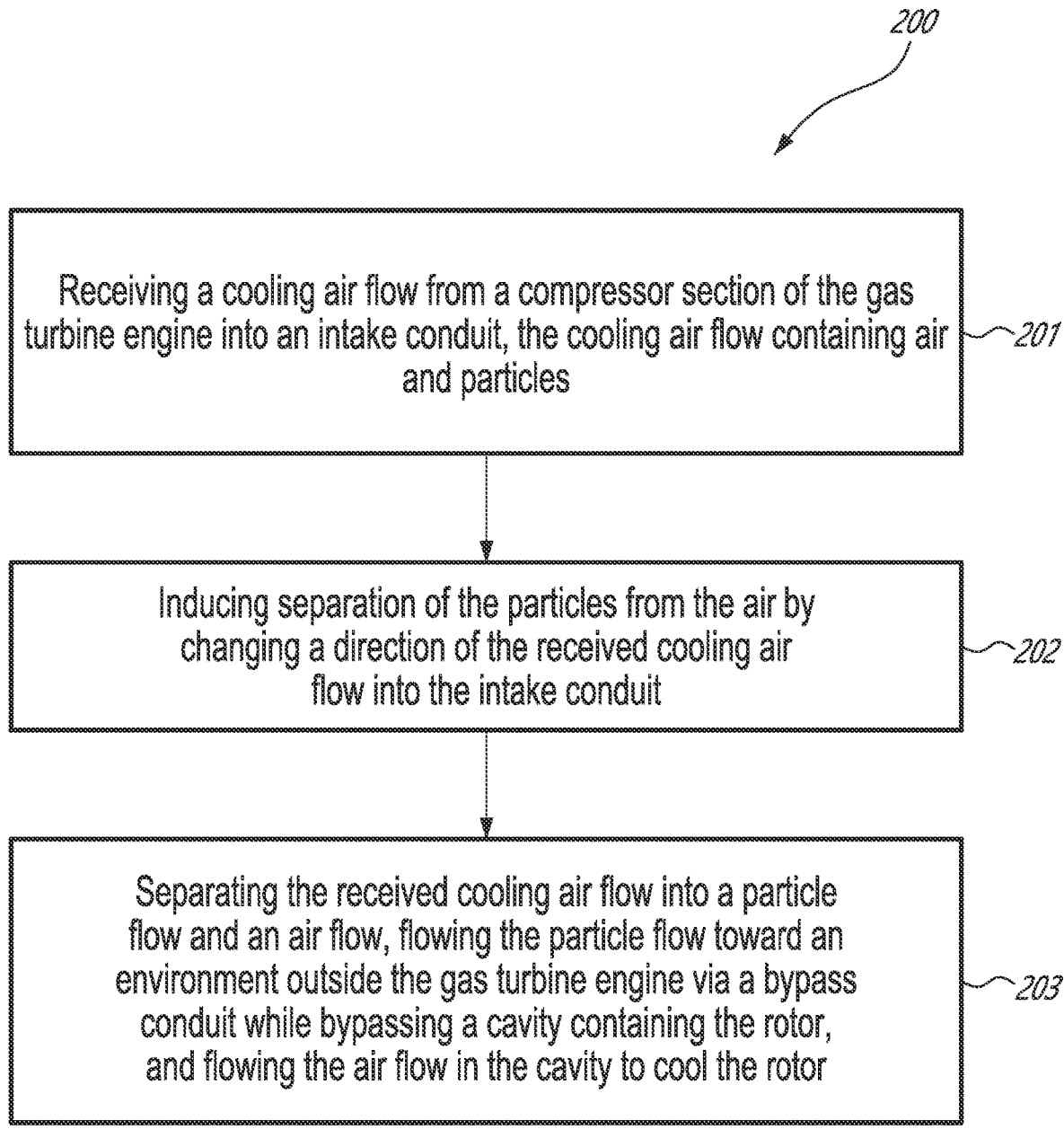
FIG. 9 is a flow chart illustrating steps of a method of supplying cooling air to a rotor of a turbine section of the gas turbine engine of FIG. 1.

Referring now to FIG. 9, a method 200 of supplying cooling air to the rotor 18b of the turbine section 18 of the gas turbine engine 10 is shown. The method includes the step 201 of receiving the cooling air flow F1 from the compressor section 14 of the gas turbine engine 10 into the intake conduit 31, the cooling air flow F1 containing air and particles; the step 202 of inducing separation of the particles from the air by changing a direction of the received cooling air flow F1 into the intake conduit 31; and the step 203 of separating the received cooling air flow F1 into a particle flow F2 and an air flow F3, flowing the particle flow F2 toward the environment E outside the gas turbine engine 10 via the bypass conduit 33 while bypassing the first cavity 28a containing the rotor 18b, and flowing the air flow F3 in the first cavity 28a containing the rotor 18b to cool the rotor 18b.

In the embodiment shown, the receiving of the cooling air flow F1 includes receiving the cooling air flow F1 in the plenum 26 upstream of the intake conduit 31, the intake conduit 31 extending into the plenum 26. The inducing of the separation may include separating the received cooling air flow F1 with the splitter 34 extending into the intake conduit 31, the splitter 34 separating the intake conduit 31 into the bypass conduit 33 and the inlet conduit 32. The flowing of the particle flow F2 toward the environment E and the flowing of the air flow F3 in the first cavity 28a containing the rotor 18b may include: receiving the particle flow F2 into the second cavity 28b separated from the first cavity 28a containing the rotor 18b via the baffle 35 and flowing the received particle flow F2 from the second cavity 28b toward the environment E, and receiving the air flow F3 into the first cavity 28a and flowing the received air flow F3 in the first cavity 28a containing the rotor 18b.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine, comprising:
a compressor section;
a turbine section downstream of the compressor section, the turbine section having a rotor rotatable about a central axis; and
an inertial particle separator located upstream of the turbine section and downstream of the compressor section relative to a cooling air flow from the compressor section, the inertial particle separator having:
a plurality of intake conduits in fluid flow communication with the compressor section, each intake conduit of the plurality of intake conduits defining an elbow and having a radially-outer wall and a radially-inner wall, each intake conduit of the plurality of intake conduits comprising:
a splitter, a leading edge of the splitter located downstream of the elbow, the splitter located to divide a flow received in the respective intake conduit into a particle flow and an air flow, and
an inlet conduit and a bypass conduit located on respective opposite sides of the splitter, the inlet conduit having an inlet conduit inlet defined by the radially-outer wall and the splitter, the bypass conduit having a bypass conduit inlet defined by the radially-inner wall and the splitter, the inlet conduit receiving the air flow, the inlet conduit in fluid flow communication with a cavity containing the rotor for cooling the rotor of the turbine section, the bypass conduit receiving the particle flow, the bypass conduit in fluid flow communication with an environment outside the gas turbine engine while bypassing the cavity containing the rotor.

2. The gas turbine engine of claim 1, wherein the turbine section includes stator vanes located upstream of the rotor, the stator vanes secured to a structural member, each intake conduit extending in a respective aperture defined through the structural member.

3. The gas turbine engine of claim 2, wherein the apertures are circumferentially distributed about the central axis.

4. The gas turbine engine of claim 3, wherein the plurality of intake conduits are tubes.

5. The gas turbine engine of claim 4, wherein the tubes have circular cross-sections.

6. The gas turbine engine of claim 2, wherein each intake conduit of the plurality of intake conduits is defined by a tube extending through the respective aperture, a portion of each tube extending away from the structural member and away from the rotor into an annular plenum circumferentially extending around the central axis, the annular plenum defined radially between the structural member and an outer liner of a combustor of the gas turbine engine, the combustor located downstream of the compressor section and upstream of the turbine section.

7. The gas turbine engine of claim 1, wherein the inertial particle separator includes a first baffle, each intake conduit of the plurality of intake conduits extending through the first baffle, a second baffle secured to the first baffle, each splitter is a portion of the second baffle.

8. The gas turbine engine of claim 7, wherein the first baffle has a first edge secured to the second baffle and a second edge opposed to the first edge, the second edge extending radially outwardly relative to the central axis and radially overlapping slots of a disk of the rotor, the slots receiving roots of blades of the rotor.

9. The gas turbine engine of claim 7, wherein the first baffle has a first edge secured to the second baffle and a second edge opposed to the first edge, the second edge secured to a structural member of the gas turbine engine.

10. The gas turbine engine of claim 7, wherein the cavity is a first cavity located between the first baffle and the second baffle and the rotor, a second cavity located between the first baffle and the second baffle, the first cavity communicating with the inlet conduit of each intake conduit of the plurality of intake conduits, the second cavity communicating with the bypass conduit of each intake conduit of the plurality of intake conduits.

11. The gas turbine engine of claim 10, wherein an outlet of the second cavity is defined by an annular gap between a radially outer edge of the first baffle and shrouds of vanes of a turbine stator located upstream of the rotor, or wherein the outlet is defined by an aperture through a shaft of the gas turbine engine, the aperture communicating with an internal passage of the shaft.

12. A gas turbine engine, comprising:
a compressor section;
a turbine section downstream of the compressor section, the turbine section having a rotor rotatable about a central axis; and
an inertial particle separator located upstream of the turbine section and downstream of the compressor section relative to a cooling air flow from the compressor section, the inertial particle separator having:
a plurality of intake conduits in fluid flow communication with the compressor section, each intake conduit of the plurality of intake conduits defining an elbow, each intake conduit of the plurality of intake conduits comprising:
a splitter, a leading edge of the splitter located downstream of the elbow, the splitter located to divide a flow received in the respective intake conduit into a particle flow and an air flow, and
an inlet conduit and a bypass conduit located on respective opposite sides of the splitter, the inlet conduit and the bypass conduit being non-annular, the inlet conduit receiving the air flow, the inlet conduit in fluid flow communication with a cavity containing the rotor for cooling the rotor of the turbine section, the bypass conduit receiving the particle flow, the bypass conduit in fluid flow communication with an environment outside the gas turbine engine while bypassing the cavity containing the rotor.

13. The gas turbine engine of claim 12, wherein the turbine section includes stator vanes located upstream of the rotor, the stator vanes secured to a structural member, each intake conduit extending in a respective aperture defined through the structural member.

14. The gas turbine engine of claim 13, wherein the apertures are circumferentially distributed about the central axis, the plurality of intake conduits are tubes.

15. The gas turbine engine of claim 13, wherein each intake conduit of the plurality of intake conduits is defined by a tube extending through the respective aperture, a portion of each tube extending away from the structural member and away from the rotor into an annular plenum circumferentially extending around the central axis, the annular plenum defined radially between the structural member and an outer liner of a combustor of the gas turbine engine, the combustor located downstream of the compressor section and upstream of the turbine section.

16. The gas turbine engine of claim 12, wherein the inertial particle separator includes a first baffle, each intake conduit of the plurality of intake conduits extending through the first baffle, a second baffle secured to the first baffle, each splitter is a portion of the second baffle.

17. The gas turbine engine of claim 16, wherein the first baffle has a first edge secured to the second baffle and a second edge opposed to the first edge, the second edge extending radially outwardly relative to the central axis and radially overlapping slots of a disk of the rotor, the slots receiving roots of blades of the rotor.

18. The gas turbine engine of claim 16, wherein the first baffle has a first edge secured to the second baffle and a second edge opposed to the first edge, the second edge secured to a structural member of the gas turbine engine.

19. The gas turbine engine of claim 16, wherein the cavity is a first cavity located between the first baffle and the second baffle and the rotor, a second cavity located between the first baffle and the second baffle, the first cavity communicating with the inlet conduit of each intake conduit of the plurality of intake conduits, the second cavity communicating with the bypass conduit of each intake conduit of the plurality of intake conduits.

20. The gas turbine engine of claim 19, wherein an outlet of the second cavity is defined by an annular gap between a radially outer edge of the first baffle and shrouds of vanes of a turbine stator located upstream of the rotor, or wherein the outlet is defined by an aperture through a shaft of the gas turbine engine, the aperture communicating with an internal passage of the shaft.

* * * * *